United States Patent Office 3,025,278
Patented Mar. 13, 1962

3,025,278
METHOD OF CONTROLLING THE DYEABILITY OF ACRYLONITRILE POLYMERS
Leonard S. Pitts, Waynesboro, Va., assignor to E. I. du Pont de Nemours and Company, Wilmington, Del., a corporation of Delaware
No Drawing. Filed Dec. 29, 1955, Ser. No. 556,069
4 Claims. (Cl. 260—85.5)

This invention relates to the polymerization of acrylonitrile polymers and copolymers and more specifically to a new and novel method of controlling the dyeability of such polymers when dyed with basic dyes while maintaining a constant molecular weight.

In the manufacture of polymers of acrylonitrile, including copolymers, containing 85% or more of acrylonitrile, difficulty has been experienced in maintaining both uniform dyeability and uniform molecular weight.

At present these polymers and copolymers are usually prepared in aqueous acidic media using a perdisulfate derivative as a catalyst and a sulfoxy reducing agent as an activator. Some of the terminal groups of the polymer chain are $-SO_3H$ and $-SO_4H$. In this process the inherent dyeability of the polymer is a function of the number and type of end groups and also of the methyl acrylate or similar monomer used to alter the dyeability of the acrylonitrile polymer. In the normal control of the dyeability of the polymer, the total number of end groups or "dye sites" is regulated by changing the molecular weight while the diffusion of dye into the fiber is regulated by changing the methyl acrylate or similar comonomer. This method of control is not completely satisfactory because it requires changes in the process with a considerable lag in time to alter the dyeability of the resulting polymer.

It is therefore an object of this invention to provide an improved control of dyeability of acrylonitrile polymers while maintaining a uniform molecular weight of the polymer. Another object is to control the dyeability of copolymers without altering the percentage of the acrylonitrile or comonomer. Other objects of the invention will be apparent as the description of the invention proceeds.

These and other objects are accomplished by polymerizing acrylonitrile and its comonomers in which the acrylonitrile portion is present to the extent of about at least 85 wt. percent in the presence of a perdisulfate catalyst and a bisulfite or similar water-soluble activator in a process commonly known in the art as a constant environment polymerization. More specifically this process is described and claimed by Guess and McCaskill in U.S. Patent 2,693,462. The molecular weight and polymer desired is determined and the amount of total catalyst and activator required to produce this polymer is charged in a reaction vessel as described in the patent. The process is carried out in the usual way and samples are taken periodically, usually every few hours, for molecular weight determinations and dyeability comparison of the polymer with that of a control. The molecular weight is increased or decreased by appropriate adjustment of the total amount of combined catalyst and activator.

The term dyeability as used in this application has its conventional meaning. The determination of dyeability values may be made according to the dyeing tests outlined on page 508 of "The Bleaching, Dyeing and Chemical Technology of Textile Fibers" by Trotman (1946).

It has now been found that the dyeability may be controlled by varying the ratio of catalyst to activator while maintaining their total combined amount the same. Variation of the ratio of catalyst to activator within the limits disclosed does not produce any significant change in the molecular weight of the polymer as measured by its intrinsic viscosity. If a correction in molecular weight is desired without altering dyeability, the correction can be obtained by shifting the total concentration of the catalyst and activator. On the other hand, if the dyeability is desired to be increased, the ratio of catalyst to activator is increased; whereas, if the dyeability is desired to be decreased, the ratio of the catalyst to activator is decreased.

The ratio of catalyst to activator will usually be between 1 part of catalyst to about 1.0 parts of activator to 1 part of catalyst to about 4.3 parts of activator. The combined concentration of catalyst and activator is usually between 0.5% and 5% of the monomeric additions to the reaction vessel. The intrinsic viscosity of the polymer normally lies between 0.8 and 3.0 which represents a molecular weight of the order of 40,000 to 150,000 and within a specific lot varies no more than ±5% from the mean value.

The catalyst and activator are usually potassium perdisulfate and sodium bisulfite, respectively, in view of their commercial availability and price, however, any water-soluble derivative of a perdisulfuric acid such as the ammonium or alkali metal salts thereof are satisfactory. The activator is a reducing agent which is believed to speed up the decomposition of the perdisulfate catalyst into active polymerization initiators. The preferred activators are the water-soluble oxidizable sulfoxy compounds such as sodium bisulfite, sodium metabisulfite, sulphur dioxide, sodium hydrosulfite, diethylsulfite, and similar salts and ester of sulfurous acid. Mercaptans such as ethyl mercaptan, mercaptoethanol, mercaptoacetic acid and mercaptophenol may be used to advantage in combination with the oxidizable sulfoxy compounds. Any water-soluble sulfoxy type reducing agent is operative as the activator.

The polymer may be a homopolymer of acrylonitrile or a copolymer with up to 15% of one or more of an ethylenically unsaturated monomer copolymerizable with acrylonitrile such as the following: vinyl pyridines, methyl vinyl ketone, vinyl acetate, vinyl chloride, styrene, acrylamide, styrene sulfonic acid, allyl sulfonic acid, hydrolyzable salts of these and similar sulfonic acids, the lower alkyl acrylates and methacrylates.

In general, in carrying out the process, the reactor is filled about half full with water and adjusted to a pH of about 2.75 to 3.75 and heated to the desired polymerization temperature before introducing the catalyst and activator. The monomeric material and water are generally introduced at steady state rates, while catalyst and activator are introduced at higher than steady state rates for a predetermined time. After this time, the catalyst and activator flows are reduced to the expected steady state values and all flows are then held uniform. As the process proceeds, frequent samples are taken for control purposes. The dyeability desired is selected as a norm using a basic dye such as "brilliant green crystals" (Color Index 662). If subsequent tests shows that the dyeability is above 100% using the norm as 100%, the ratio catalyst to activator is decreased; e.g., if 1 part of catalyst is used with 2.1 parts of activator, the amount of activator is increased to 2.4 parts for example, which may be expected to bring the dyeability down to approximately 100%. On the other hand, if the dyeability should fall below 100%, the amount of activator should be decreased a few tenths of a part to bring the dyeability back to 100%.

The following examples are given by way of illustration to show the effect on dyeability of adjusting the catalyst to activator ratio. The examples, however, are merely illustrative and it is to be understood that the polymer used may be replaced in equal amount by any of those mentioned above, and the catalyst and activator may likewise be replaced in equivalent amounts by any of those previously mentioned.

Example I

In a continuous polymerization of acrylonitrile methyl acrylate copolymer in the proportion of 94 to 6 by the method disclosed in U.S. 2,693,462, the pH was adjusted to about 3.25 at a temperature of about 45° C. The polymerization was run until steady state conditions were established and a test run made over a period of 10 days. A dyeability of 105% was selected for the product. The percent dyeability is an arbitrary relative scale of intensity using a polymer of average mol weight as 100%. During the first 4 days a ratio of 1 part of potassium perdisulfate and 2.1 parts of sodium bisulfite as activator was used. The percent dyeability was found to have increased slightly between the second and fourth days. Thereupon the ratio was changed to 1 part of catalyst to 2.4 parts of activator. The percent dyeability then decreased until the end of the fifth day at which time the catalyst ratio was changed from 1:2.4 to 1:2.1. The dyeability then increased until the seventh day when the ratio catalyst:activator was again reduced from 1:2.1 to 1:2.4. During the eigth and ninth days the percent dyeability was lowered to an average range between about 100% to 104%. During the experiment, the intrinsic viscosity was fairly constant. A change in total catalyst plus activator was made for about one day near the end of the first day's run when the total concentration of catalyst and activator was changed from 2.30% to 2.26% based on the monomer, while the same ratio 1:2.1, i.e., .73 percent catalyst and 1.55% activator was used. In the seventh day the intrinsic viscosity started downwardly and changes were made in the total catalyst plus activator additions, eventually reducing the percent additions to about 2.19%, after which the desired intrinsic viscosity value of 1.51 was obtained.

Example II

The same polymerization conditions were used as described in Example I, except the test was made at a different time of year which required different catalyst activator ratios. At the start of the test, the rate of catalyst plus activator additions was 2.29% of the rate of the monomer additions at a ratio of 1:1.7; i.e., 0.85% catalyst and 1.44% activator. Near the end of the second day, the ratio was changed to 1:1.2 while maintaining the total catalyst plus activator concentration the same. It will be noted that these ratios are different from those of Example I, but the average dyeability was approximately the same; i.e., between 100% to 105%. During the run, changes in the catalyst:activator ratios were made as explained in Example I, resulting in a change in dyeability when it varied more than a few percent from 105%. The intrinsic viscosity was reasonably constant throughout the ten-day run and only small changes were made in the total concentrations.

Example III

Polymerization conditions similar to those of Example I were maintained. The total catalyst plus activator was maintained at approximately 2.43% of the monomer feed which held the intrinsic viscosity substantially constant at the desired level. During the ten-day period of the run changes in catalyst to activator ratios from 1:1.4 to 1:1.7 were made which brought the dyeability from about 107 down to about 103 where it remained for about three days. At the end of this period, the ratio was increased to 1:1.4 and the dyeability immediately rose to from 106 to 111.

These tests clearly show that the dyeability can be controlled easily and effectively by changing the catalyst to activator ratios. For actual day to day control, corrections for improved uniformity of dyeability may be made oftener with less drastic changes in the ratio than those used to illustrate the invention. For example, if the desired dyeability level is 105 within limits of ±3% (108% and 102%) corrective action may be taken when (1) Three consecutive points based on 2-hour samples are above 108% or below 102%;

(2) Two consecutive points are above 110% or below 100%;

(3) Seven consecutive points are on the same side of 105%.

Even though there is a considerable lag, such as from 8 to 12 hours due to scheduling and testing time, in obtaining dyeability results, and a further time lag of about 8 hours to obtain the maximum effect after the correction has been made, satisfactory uniformity has been obtained. Further, the dyeability and intrinsic viscosity results obtained from the preliminary samples should be considered along with results obtained from storage bin samples in determining the correct ratio and concentration of catalyst and activator to maintain the final blended polymer within the desired limits.

The present invention offers the advantage of a simple and easily controlled method of obtaining uniform dyeability in acrylonitrile polymers and copolymers without altering the molecular weight of the resulting polymer.

It will be apparent that many widely different embodiments of this invention may be made without departing from the spirit and scope thereof, and therefore it is not intended to be limited except as indicated in the appended claims.

I claim:

1. In a continuous process of preparing polymers containing at least 85% acrylonitrile and up to 15% of an ethylenically unsaturated monomer copolymerizable therewith of substantially constant molecular weight in which the monomeric material is subject to homogeneous constant environment polymerization in an aqueous medium containing a water-soluble perdisulfate catalyst and a water-soluble sulfoxy reducing agent as an activator, the improvement of producing uniform dyeability of the polymer with basic dyes which comprises increasing the amount of activator with respect to the catalyst to lower the dyeability, and decreasing the amount of activator with respect to the catalyst to increase the dyeability, and continuing such adjustments when the dyeability of the polymer deviates more than about ±3% from the selected norm the combined amount of catalyst and activator being substantially constant.

2. The process of claim 1 in which the intrinsic viscosity of the polymer is between 0.8 and 3.0 and within a specific lot varies no more than ±5% from the mean value.

3. The process of claim 1 in which the combined catalyst and activator feed is between 0.5% and 5.0% of the monomer feed.

4. The process of claim 1 in which the catalyst to activator ratio is between 1:1.0 to 1:4.3.

References Cited in the file of this patent
UNITED STATES PATENTS

| | | |
|---|---|---|
| 2,719,834 | Craig et al. | Oct. 4, 1955 |
| 2,743,263 | Coover et al. | Apr. 24, 1956 |